(12) United States Patent
Motz et al.

(10) Patent No.: US 6,544,657 B1
(45) Date of Patent: Apr. 8, 2003

(54) SYNTHESIS OF OLIGOSILAZANE-CONTAINING COMPOUNDS FOR THE PRODUCTION OF A CERAMIC-LIKE MATERIAL

(75) Inventors: Gunter Motz, Bayreuth (DE); Frauke Stenzel, Buchen (DE); Gunter Ziegler, Eckersdorf (DE)

(73) Assignee: The Federal State of Bavaria, Germany as represented by The University of Bayreuth, Bayreuth (DE)

( * ) Notice: Subject to any disclaimer, the term of this patent is extended or adjusted under 35 U.S.C. 154(b) by 0 days.

(21) Appl. No.: 09/685,776

(22) Filed: Oct. 10, 2000

Related U.S. Application Data

(60) Provisional application No. 60/159,057, filed on Oct. 12, 1999.

(51) Int. Cl.[7] .................. B32B 27/28; B05D 3/62; C08G 77/54; C08G 77/382
(52) U.S. Cl. ............. 428/446; 428/428; 428/429; 428/448; 428/450; 427/387; 427/388.1; 427/388.2; 427/389.7; 427/393.5; 427/393.6; 556/412; 528/28; 528/33; 528/38
(58) Field of Search ............... 528/28, 33, 38; 556/412; 427/387, 388.1, 388.2, 389.7, 393.5, 393.6; 428/428, 429, 446, 448, 450

(56) References Cited

U.S. PATENT DOCUMENTS

| | | | | |
|---|---|---|---|---|
| 4,482,669 A | * | 11/1984 | Seyferth et al. | 524/442 |
| 4,645,807 A | * | 2/1987 | Seyferth et al. | 525/474 |
| 4,659,850 A | * | 4/1987 | Arai et al. | 556/409 |
| 5,173,367 A | * | 12/1992 | Liimatta et al. | 428/408 |
| 5,198,152 A | * | 3/1993 | Liimatta et al. | 252/389.31 |
| 5,208,192 A | * | 5/1993 | Yu et al. | 501/92 |
| 5,208,284 A | * | 5/1993 | Niebylski | 524/382 |
| 5,322,913 A | * | 6/1994 | Blum et al. | 528/15 |

OTHER PUBLICATIONS

English Abstract of JP 02182919 A, Jul. 1990, Aoki et al.*
English Abstract of JP 04272227 A, Jan. 1991, Kato et al.*

* cited by examiner

Primary Examiner—Margaret G. Moore
Assistant Examiner—Jeffrey B. Robertson
(74) Attorney, Agent, or Firm—Wood, Herron & Evans, L.L.P.

(57) ABSTRACT

The invention concerns a synthesis method for an oligosilazane-containing condensation product comprising the following step:

conversion of oligosilazane composition with an average molecular weight of no more than 1000 g/mol, with a dialk(en)ylamino compound of the following formula (I)

$$A[N(R^4)_2]_m \qquad (I)$$

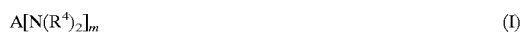

in which A is at least one element chosen from B, Al, Ti, Zr, and Hf, $R^4$ is an alkyl group or alkenyl group and m is the valence of element A, in which the reaction is run so that an average of 1.6–2.2 mol $HN(R^4)_2$ per mol of dialk(en)ylamino compound of formula (I) is split off;

an oligosilazane-containing condensation product obtained according to this method; a method for production of a substrate coated or infiltrated with a ceramic-like material, comprising the following steps:

coating or infiltration of the substrate with a solution of the aforementioned oligosilazane-containing condensation product, evaporation of the product and curing of the oligosilazane-containing condensation product, as well as a coated or infiltrated substrate obtained according to this method.

18 Claims, 1 Drawing Sheet

SYNTHESIS OF OLIGOSILAZANE-CONTAINING COMPOUNDS FOR THE PRODUCTION OF A CERAMIC-LIKE MATERIAL

This application claims the benefit under 35 USC §119(e) of U.S. Provisional Application Serial No. 60/159,057, dated Oct. 12, 1999, and having the same inventors as the present application.

TECHNICAL FIELD

The present invention concerns an oligosilazane-containing condensation product, a method for its production, a method for production of a substrate coated or infiltrated with a ceramic-like material using this condensation product and the coated or infiltrated substrate obtained according to this method.

TECHNICAL BACKGROUND

The economic loss caused every year by wear and corrosion of materials is estimated at several billion DM. Interest in protective layers for materials that adversely affect the advantageous properties of the materials as little as possible and at the same time guarantee effective protection against environmental effects and wear has continuously risen in parallel with development of new materials. Increasingly often the base material acquires a purely supporting role, whereas the coating fulfills the actual function. Coatings must therefore be developed for all types of substrates, metals, polymers, glass and ceramics. Both new coating methods and materials are required for this, which are geared not only to material requirements, but also economic ones.

Varnishes and paints, metal coatings, or enamel layers have traditionally been used as protective layers. Varnishes and paints are characterized by simple application (brushing, dipping, spraying). However, they exhibit drawbacks in terms of low temperature stability, insufficient wear and corrosion protection, as well as limited resistance to solvents.

Metal coatings are generally applied by means of melting baths by electrochemical deposition or by PVD or CVD processes. Typical examples are metal layers obtained by galvanizing or chrome plating. However, metal coatings generally exhibit limited corrosion stability, especially limited stability relative to acids and alkalis. Moreover, ecological problems arise owing to the fact that the employed chemicals are often toxic and their handling and disposal pose serious problems.

Enamel layers are used as scratch-proof layers for decorative purposes and in the domestic area. The advantage lies in their simple and thus cost-effective application (dipping bath). In many applications the increases in strength and abrasion properties achieved, however, do not meet the requirements to a sufficient degree. Enamel layers are also very sensitive to mechanical deformations.

Because of their high corrosion and temperature stability, their hardness and ecological compatibility, interest in the production of ceramic protective layers has therefore steadily increased over the last 50 years.

Oxide ceramic layers can be-produced by CVD or PVD methods or by wet chemical methods using the so-called sol-gel process. The advantages of the sol-gel process are high purity of the employed educts that can be attained and thus a high purity of the ceramic layer, good homogeneity of the layer, as well as the possibility of also coating internal surfaces, like the insides of pipes. However, in addition to the high cost of the educts, drawbacks include limited attainable layer thickness (<1 $\mu$m) and restriction to oxide systems. The emphasis in layers produced in the sol-gel process therefore now lies in the areas of optically and electrically conducting layers, as well as in the decorative field.

Nonoxide ceramic compounds between the elements boron, carbon, nitrogen and silicon or titanium are also characterized by high [degree of] hardness and wear or corrosion resistance. Silicon nitride ($Si_3N_4$) is of special interest as a first-rate material for use in engine construction. Because of its high modulus of elasticity, limited heat expansion, and high resistance to elastic deformation, this material can be employed in a variety of ways. Nonoxide ceramic layers, like TiN, TiCN or even amorphous carbon are now applied in industry primarily with the CVD/PVD process. Reproducible hard material layers adapted to special problems can be produced in this way. The mentioned methods are suitable in particular for automatic process control. The drawbacks of these methods are the high equipment expense and the high costs resulting from this. The high temperatures required, difficult handling of the gaseous starting materials and the formation of aggressive byproducts are drawbacks in the CVD process. Precise process control is essential for production of high-quality PVD layers; internal coating with this method can only be accomplished with great difficulty.

For the reasons just mentioned, the search for alternatives to the CVD and PVD methods has intensified in recent years in order to produce nonoxide ceramics, especially with the elements boron, carbon, nitrogen, silicon, and titanium. One approach is the production of these ceramic layers by pyrolysis of appropriate organoelemental polymers. Thus, it is known that polysilazanes, polyborosilazanes or polycarbosilanes can be converted to ceramic materials with the elements Si—N, B—Si, or C—Si. Production of ceramics from such organoelemental compounds can be divided into four steps:

synthesis of preceramic oligomers or polymers from monomer units crosslinking of these precursors to form two- or three-dimensional preceramic networks conversion of the network to covalent ceramics by transition from an organic to an inorganic phase mostly by heat treatment ("ceramization")

optionally crystallization of the amorphous solid to thermodynamically stable phases via different metastable intermediate states.

High-purity products with a completely homogeneous distribution of elements at the atomic level and controllable microstructures are obtained with this method at relatively low temperatures.

G. Ziegler, J. Hapke, and J. Lucke report in "Ceramic Transactions," 58 (1995), pp. 13–22 on an attempt to produce ceramic phases (materials) from precursors obtained by the reaction of $Ti(NMe_2)_4$ with low-molecular polysilazane. The vinyl- and methyl-substituted polytitanosilazane PTS2 so obtained is described as a highly viscous resin, the methyl-substituted PTS1 as a solid. The following formula is given for PTS1: —[$R^1SiR^2$—$NR^3$—]$_n$, in which $R^1$=H, $R^2$=Me, and $R^3$=Ti(MMe$_2$)$_3$. The formula of PTS2 corresponds to that of PTS1, except for the fact that $R^1$=—CH=CH$_2$. Carbon fibers and silicon carbide fibers are infiltrated under reduced pressure with liquid precursor and heated to as much as 1000° C. after curing at about 250° C. to produce ceramic materials in this publication. According to the data of the authors the ceramic precursors, for example PTS1, which are formed after cooling of the reaction mixture as solids, can also be used for infiltration if the reaction to PTS1 is run at lower temperatures (about 60° C.) and shorter reaction times. However, conversion under these conditions is incomplete and the ceramic precursors, like PTS1, therefore acquire unconverted educts. The authors propose in particular infiltration of fibers with liquid (educt-containing) PTS1 at about 60° C. in order to complete the reaction to PTS1 by heating to 110–120° C. During additional heat treatments above this temperature the ceramic precursors are then converted to infusable solids or amorphous ceramics.

The two process variants (for PTS1 and PTS2), however, exhibit decisive shortcomings. The highly viscous resins (vinyl-substituted polytitanosilazanes, like PTS2) exhibit poor adhesion to the substrate and run off the substrate at higher temperatures. When educt-containing PTS1 is used, crosslinking of the silazane educt by titanium atoms only starts during pyrolysis and leads to serious swelling of the polymer because of the numerous gaseous cleavage products. Only very inadequate ceramic materials are therefore obtained.

The task of the present invention was therefore to find precursors for ceramic-like materials, with which any substrate can be properly wetted, which also exhibit excellent adhesion to the substrate at the temperatures required for curing and ceramization, which produce a homogeneous, especially crack-free layer, during curing and ceramization, and which lead to the desired ceramic-like materials in high yield.

A further task of the present invention was to find an appropriate method for application/infiltration of these precursors onto/into the substrate and for curing of the precursors, which leads to homogeneous ceramic-like materials that exhibit no cracks in particular (for example, from decomposition products).

Finally it was a task of the present invention to offer a ceramic-like material (in conjunction with a substrate), which has a homogeneous, especially crack-free structure and is characterized by properties like hardness, wear resistance, temperature and corrosion resistance.

BRIEF DESCRIPTION OF THE INVENTION

The present invention concerns a synthesis process for an oligosilazane-containing condensation product (curable precursor for ceramic-like material), comprising the following step:

conversion of oligosilazane composition with an average molecular weight of no more than 1000 g/mol, with a dialk(en)ylamino compound of the following formula (I)

$$A[N(R^4)_2]_m \quad (I)$$

in which A represents at least one element chosen from B, Al, Ti, Zr and Hf, $R^4$ is an alkyl group or alkenyl group and m is the valence of element A, in which the reaction is run so that an average of 1.6–2.2 mol $HN(R^4)_2$ per mol of dialk(en)ylamino compounds of formula (I) is split off.

The present invention also concerns an oligosilazane-containing condensation product obtained according to this process.

Finally, the present invention concerns a process for production of a substrate coated or infiltrated with a ceramic-like material, comprising the following steps:

partial or complete coating or infiltration of a substrate with a solution of the aforementioned oligosilazane-containing condensation product, evaporation of the solvent and curing of the oligosilazane-containing condensation product in the coated or infiltrated substrate, as well as a substrate coated or infiltrated with a ceramic-like material obtained according to this process.

DETAILED DESCRIPTION OF THE INVENTION

Figure 1:
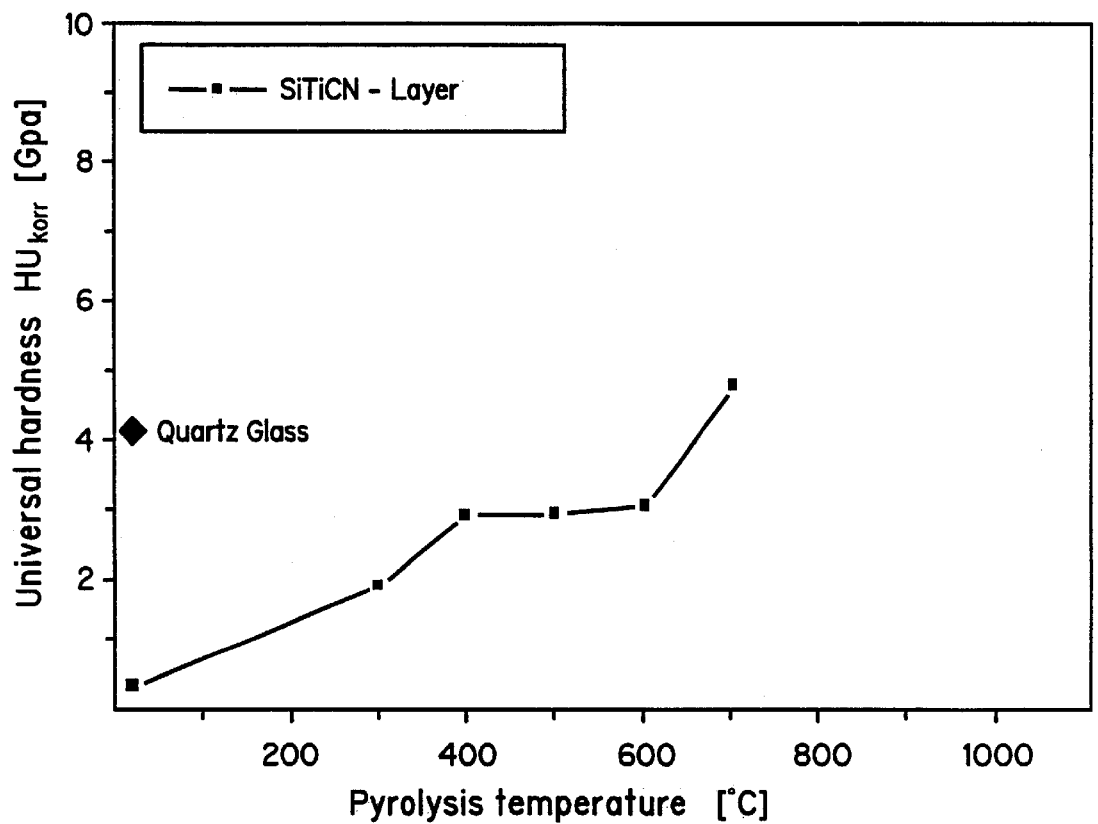
FIG. 1 is a graphic view of the hardness of SiTiCN layers on a steel sheet, which were cured at different temperatures.

Process for production of an oligosilazane-containing condensation product (curable precursor for ceramic-like material)

The oligosilazane employed in the synthesis method for the oligosilazane-containing product contains silazane units of the formula $-[HN-SiH_2]_n-$, in which the H atoms can be substituted at least partially by saturated and/or unsaturated hydrocarbon groups. Oligosilazanes, that are substituted at least partially with saturated and/or unsaturated hydrocarbon groups have the advantage over unsubstituted oligosilazanes of higher stability (lower explosion hazard) and thus safer handling.

The hydrocarbon groups can replace individual hydrogen atoms of the HN units in the oligosilazane, but not all of them. However, it is preferred that the hydrocarbon groups only substitute at least partially the hydrogen atoms of the Si atom of the silazane units. The saturated and/or unsaturated hydrocarbon groups preferably are alkyl or alkenyl. (Unless otherwise stated, the expressions "alkyl" or "alkenyl" in the description of the present invention always preferably stand for hydrocarbon groups with 1–4 carbon atoms).

Examples of saturated hydrocarbon groups are methyl, ethyl, propyl, isopropyl, n-butyl or t-butyl, in which methyl is preferred. Preferred examples of unsaturated hydrocarbon groups are allyl and vinyl. Vinyl groups in the employed oligosilazane make possible additional crosslinking before and during curing of the oligosilazane-containing condensation product by hydrosilylation reactions with available SiH functions. Similarly, additional crosslinking by polymerization reactions can be achieved when allyl groups are used.

The average molecular weight (weight average) of the employed oligosilazane composition is no more than 1000 g/mol.

The lower limit of the average molecular weight of the oligosilazane composition is preferably 240 g/mol. At an average molecular weight below this value difficulties can arise because of the volatility of the employed oligosilazane if the condensation reactions are run with the compound of formula (I) at higher temperature. The average molecular weight preferably lies between 290 and 850, especially between 290 and 700 g/mol. The use of liquid oligosilazane compositions has proven advantageous in principle, since the liquid state guarantees good mixing of the reaction mixture during the reaction with the compound of formula (I). Especially during use of oligosilazane compositions with viscosities of no more than 25 Pa·s at a temperature of 20° C., it was possible to control the reaction well and achieve the desired conversion of the educts.

The oligosilazanes in the composition can be branched or unbranched. The oligosilazanes can be cyclic or acyclic. The acyclic silazanes can have the —SiR³ group at the N terminus or the —NH—SiR³ group at the Si terminus as the terminal group, in which R³ can denote alkyl or alkenyl. The average number of silazane units per oligosilazane is guided according to the size and number of hydrocarbon groups. At a limited number of hydrocarbon groups per oligosilazane and a small size (for example methyl) the average number of silazane units can be more than 14. However, the number ordinarily lies between 4 and 14, preferably between 4 and 12.

The oligosilazane composition preferably contains one or more oligosilazanes of the following formula (II):

$$X^1-[HN-SiR^1R^2]_n-X^2 \quad (II)$$

in which

R¹ and R², independent of each other, denote H [atoms], alkyl or alkenyl, the R¹ and/or R² groups in at least one silazane unit of [HN—SiR¹R²]$_n$ having the meaning [HN—SiR¹R²]$_{n'}$—X³;

n is a whole number from 2–14 and n' is a whole number from 0–12 with the stipulation that the sum of the silazane units per oligosilazane (sum of n and all n') is 4–14;

X¹, X² and X³, independent of each other, denote hydrogen, alkyl, alkenyl or —HN—SiR³ or —SiR³ (in which R³=alkyl or alkenyl) and X¹ and X², X¹ and X³ or X² and X³ together can represent a single bond that closes a ring.

The oligosilazane composition preferably consists of at least 80 wt %, especially at least 95 wt % (even more strongly preferred, consists completely) of oligosilazanes of formula (II).

The oligosilazane composition just described is converted with a dialk(en)ylamino compound of formula (I), i.e., the formula A[N(R⁴)₂]$_m$, in which A is chosen from B, Al, Ti, Zr or Hf. R⁴ represents an alkyl or alkenyl group and m is the valence of the element. R⁴ is preferably an alkyl group with 1–4 carbon atoms, especially a methyl group. The valence m is 3 for B and Al and 4 for Ti, Zr, and Hf.

The oligosilazane composition just described and the dialk(en)ylamino compound of formula (I) just described are converted so that an average of 1.6–2.2 mol HN(R⁴)₂ per mol of dialk(en)ylamino compound of formula (I) is split off. Checking whether the desired reaction has fully occurred is possible in simple fashion by reweighing the obtained product mixtures. The weight loss relative to the total weight of the employed educts indicates how many moles of HN(R⁴)₂ were split off.

The reaction is preferably run initially in a solution of oligosilazane composition during heating, especially under reflux of the solvent, which is then distilled off after a reaction time of 1–24 h (preferably 8–12 h).

The first step of the reaction (in a solvent) is preferably run at a temperature from 80–150° C. (preferably 90–110° C.). The second step of the reaction (distillation of the solvent to condensation in a solvent-free system) is preferably run at a higher temperature than in the first step and especially from 120–220° C. (preferably 130–160° C.). The temperature within this range is preferably chosen so that only HN(R⁴)₂, but no ammonia is split off. The end of the reaction is generally recognized in that the reaction mixture can no longer move owing to increasing viscosity. The reaction is then ideally interrupted. At this point the oligosilazane-containing condensation product obtained reaches its optimal degree of crosslinking, i.e., an average of 1.6–2.2 (especially 1.8–2.1) N(R⁴)₂ units with element A are replaced by bonds of A to nitrogen atoms of the oligosilazane.

Aprotic solvents are preferably used in the synthesis process just described, especially aprotic, nonpolar solvents, preferably (optionally alkyl-substituted) aromatic hydrocarbons with a boiling point of no more than 170° C., especially no more than 150° C. Preferred examples are toluene and xylenes.

The dialk(en)ylamino compounds of formula (I) are preferably used at a higher molar ratio relative to the oligosilazane composition than would be necessary to crosslink an average of 1.6–2.2 silazanes via an —AN(R⁴)₂ unit. A molar ratio between the average number of N atoms per oligosilazane and element A of 3.5:1–10:1 has proven advantageous with respect to running the reaction and product properties.

Oligosilazane-containing Condensation Product (Curable Precursor)

The oligosilazane-containing condensation product obtained in the method just described is a solid that does not melt even at temperatures of up to 1500° C. Aprotic, especially aprotic, nonpolar solvents, in particular, are suitable as a solvent for the solid. It is generally sensitive to air and moisture and should be stored under a protective gas (for example, nitrogen, noble gases, etc.).

This oligosilazane-containing condensation product is the curable precursor in the method described below for production of a substrate coated or infiltrated with a ceramic-like material.

Process for production of substrate coated or infiltrated with a ceramic-like material The process comprises the following three steps:

1) Partial or complete coating or infiltration of a substrate with a solution of the oligosilazane-containing condensation product just described;

2) Evaporation of the solvent; and

3) Curing of the oligosilazane-containing condensation product in coated or infiltrated substrate.

For the first step, aprotic, preferably aprotic, nonpolar solvents are suitable as the solvent. The use of cyclic or acyclic hydrocarbons with 5–10 hydrocarbon atoms is particularly preferred, for example pentane, cyclopentane, hexane, cyclohexane, heptane or octane; and the use of aromatic hydrocarbons (optionally with alkyl substituents) with 6–12 carbon atoms, for example, (oluene or xylene (for example, paraxylene). Any limited insoluble fractions are filtered off before infiltration or coating with the solution. Coating or infiltration of the substrate can be carried out according to known technical methods. The substrate is preferably dipped in the solution of oligosilazane-containing condensation products (or covered with it) or sprayed with it. This step can be repeated as often as desired, but in which it is preferred during redipping or respraying to first carry out curing, since the already applied condensation product can otherwise be separated. Because of the simple application, coating or infiltration is also possible in continuously operating industrial units. The so-called spin coating method in which the solution of oligosilazane-containing condensation product is uniformly distributed by rapid rotation of the substrate is also suitable for coating.

Use of solutions with a concentration of 1–20 wt % (1–20 g condensation product per 100 g of solvent) is preferred. To produce the most uniformly homogeneous layer possible, one generally operates with not too highly concentrated solutions of the curable precursor. With unduly high concentrations of the curable precursor there is a hazard of formation of drying cracks in the subsequent drying step. If the curable precursor is applied by spraying of the solution, concentrations of 3–5 wt % are particularly preferred, during application by dipping (pouring) concentrations of 10–17 wt % are preferred.

Infiltration of a substrate preferably occurs by dipping in a solution of curable precursor (oligosilazane-containing condensation product). The concentration of curable precursor in the solvent during infiltration is preferably 1–20 wt %. To minimize the number of infiltration steps, it can be preferred to use the curable precursor according to the invention (the oligosilazane-containing condensation product) in combination with other curable precursors. For example, carbon fibers or other porous substrates can be infiltrated as pretreatment with crosslinkable liquid polysilazanes and these then cured in order to reduce the porosity before infiltration with a solution of the precursor according to the invention and curing. Since these solutions have limited surface tension, they also penetrate into fine pores of the substrate and permit production of gas-tight materials. If one proceeds in reverse fashion and initially infiltrates the porous substrate with a solution of precursor according to the invention, the ceramic-like phase according to the invention obtained after curing can act as an adhesion promoter in the subsequent infiltration steps, for example, with liquid polysilazanes.

In the second step of the ceramization process according to the invention the solvent is evaporated. This can occur by allowing the coated or infiltrated substrate to stand at ambient pressure and room temperature or in a vacuum and/or by heating. The selected temperature is guided according to the solvent being evaporated and is usually 10–150° C. The solvent is usually evaporated over a period of 5 min to 2 h. If one does not operate in vacuum, it is preferable to evaporate the solvent in an inert gas atmosphere (nitrogen, noble gases, etc.).

Curing of the oligosilazane-containing condensation product (third step) leads to a ceramic-like material insoluble in-organic solvents.

The term "ceramic-like" material is used in the present invention, since the obtained material exhibits properties similar to ceramic materials (for example, hardness, abrasion resistance, temperature and corrosion resistance). On the other hand, the ceramic-like material according to the invention comprises more than ceramic materials that satisfy the definition given in technical lexica (for example, Rompp Chemie Lexikon, 9th edition, Thieme Verlag). Ceramics are defined there as materials constructed from inorganic and primarily nonmetallic compounds or elements and crystalline to more than 30 vol %. For example, the materials according to the invention can contain less than 30 vol % crystalline fractions or consist fully of amorphous phases. Moreover, materials according to the invention that are cured in air at lower temperatures (for example, at room temperature) contain a higher fraction of organic compounds (the hydrocarbon groups $R^1$ and/or $R^2$ or $R^4$) and therefore do not meet the above definition either.

Curing is preferably conducted in the third step in an atmosphere containing a protective gas, ammonia, oxygen, or mixtures of them.

Curing can be carried out at temperatures of up to about 1500° C. The obtained ceramic-like material is generally not thermodynamically stable above about 1500° C. A specific lower temperature limit for the curing step does not exist.

If one wishes to obtain the hardest possible ceramic-like layer, the substrate coated or infiltrated with the oligosilazane-containing condensation product is advantageously heated to temperatures of at least 500° C., especially at least 600° C. (hereafter also called firing). From about 500–600° C. one observes a distinct rise in hardness, which is attributed to increasing crosslinking of the oligosilazane-containing condensation product and the reactions that occur during ceramization. At the same time, from about 500–600° C., a distinct weight loss is observed in differential thermal analysis. The weight loss is explained, among other things, by splitting off of volatile N compounds (for example, ammonia), hydrogen and volatile hydrocarbons. Even during heating to temperatures below 500° C., an increase in hardness and weight loss is observed, but to a lesser degree than at temperatures above 500° C., especially above 600° C. This weight loss, which can begin at about 180° C., depending on the structure of the oligosilazane, is attributed to splitting off of dialk(en)ylamino substituents of the compounds of formula (I), i.e., to complete crosslinking of the NH units of the oligosilazane and element A.

Because of the weight loss that occurs and the related hazard of crack formation in the ceramic-like material from liberated gases, it can be advantageous not to heat the coated or infiltrated substrate rapidly to the final firing temperature. With infiltrated substrates one advantageously operates with temperature increase rates from 1–10 K/min. A substrate coated with the oligosilazane-containing condensation product, however, can also be increased much more quickly to the final temperature or in thin layers directly exposed to the final firing temperature without a heating period. After the final firing temperature is reached, this temperature is preferably held for 5 min to 6 h, especially 30 min to 2 h, before cooling is carried out.

The final firing temperature is initially guided according to the temperature resistance of the employed substrate. When silicon, steel, or quartz is used, one generally operates at temperatures of no more than 1000° C. In substrates that are still heat-stable at 1500° C., this temperature generally also represents the maximum firing temperature. The maximum firing temperature also depends on the atmosphere employed. In oxygen-containing atmospheres, one generally does not operate above 1200° C., in ammonia-containing atmospheres generally not above 1500° C. During firing under a protective gas, temperatures of up to 1500° C. can be briefly reached, but it is generally expedient not to exceed 1450° C.

During firing under protective gas (for example nitrogen and noble gases, especially argon) blue ceramic-like phases are generally obtained, during pyrolysis in an oxygen-containing atmosphere (for example air) the obtained ceramic-like phases are generally colorless and firing in an ammonia-containing atmosphere generally leads to yellow ceramic-like phases. An oxygen-containing atmosphere preferably contains 5–30 vol % $O_2$ and an ammonia-containing atmosphere 5–30 vol % ammonia, the remainder being protective gas.

In another preferred variant, curing is conducted without firing. Thus, curing in an oxygen-containing atmosphere, for example, air, without firing also leads to ceramic-like materials. Crosslinking reactions that would not be observed under otherwise identical conditions in a protective gas atmosphere occur because of the effect of oxygen on the oligosilazane-containing condensation product. This process variant is suitable in particular for coating and infiltration of temperature-sensitive substrates, especially plastics (polymers), for example polycarbonates. For curing (without firing) in an oxygen-containing atmosphere temperatures of 0–150° C. are particularly suitable (preferably 20–120° C.). For practical reasons, one often operates at room temperature. The oligosilazane-containing condensation product is usually brought into contact with the oxygen-containing atmosphere over a period from 5 min to 2 h, especially 30 min to 2 h. If a plastic is used (polymer) as substrate, its abrasion resistance, resistance to alkalis and acid and its oxidation resistance can be increased by coating and infiltration with the ceramic-like material obtained in this manner. Another application example is coating of metal reflector film (for example, made of aluminum) in street lights that are exposed to a corrosive atmosphere (for example, on a boardwalk) with a protective layer. The coating attained by curing is transparent and does not adversely affect the reflector properties of the metal film. At the same time, it represents effective corrosion protection.

The substrate preferably comprises at least one of the following materials: metal, carbon, glass, plastic, [or] ceramic. Composites consisting of a combination of these materials are also suitable as the substrate. Examples of metals include steel compositions, aluminum, or silicon. Examples of ceramic substrates include silicon carbide, silicon nitride, silicon carbonitride, aluminum oxide, titanium oxide, titanium nitride, and silicon oxide. Because of the limited surface tension of solutions of the oligosilazane-containing condensation product and the good wetting behavior resulting from this, it is possible, as already mentioned, to infiltrate a wide variety of porous materials. In this manner components in a class of ceramic composites can be produced. These are suitable, for example, as filters in or for aggressive media. An important area of application for coating and infiltration are high-strength and high-modulus carbon fibers (for example, Torayca T800, Tenax HT12000) and ceramic fibers, like silicon carbide fibers (e.g., Tyrano TYS1HO8PX or Nicalon 607).

The ceramic-like materials obtained according to the invention exhibit good adhesion to the substrate.

The good adhesion properties of the ceramic materials according to the invention can also be used for application of additional layers, for example, ceramic-like or ceramic layers, like enamels. In this variant, the ceramic-like material acts as an adhesion promoter between the substrate and the additional layer.

After curing and firing of the applied layer of oligosilazane-containing condensation products, the layer thickness is preferably 0.1–10 µm, especially 1 µm–5 µm. Thinner layers are preferably obtained by dipping in a dilute solution (about 1–5 wt %, especially 3–5 wt %), thicker layers by spraying of the substrate with concentrated solutions (about 10–20, especially 10–17 wt %). Moreover, the thickness of the layer can also be influenced by the choice of solvent. Rapidly evaporating solvents generally lead to thicker layers. Thicker layers are generally also obtained during better wetting of the substrate by the solvent.

It is possible with the curable precursor according to the invention (oligosilazane-containing condensation product) to coat or infiltrate a substrate in controlled fashion with a ceramic-like material. Since the curable precursor is a solid, thin layers of it can be produced by application of the solution and evaporation of the solvent. Relative to known precursors, the precursor according to the invention has the decisive advantage that it does not melt even at higher temperatures. It therefore retains the stipulated geometry and also adheres very well to the substrate. Another decisive advantage is that because of the already achieved degree of substitution on the crosslinking central atom A (B, Al, Ti, Zr, or Hf) of 1.6–2.2 on average, no uncontrolled liberation of gaseous components that could damage the structure of the ceramic phase occurs.

The ceramic-like materials producible from these precursors are characterized in particular by their adhesion strength to a wide variety of substrates, in addition to the typical properties for ceramics, like hardness, abrasion resistance, temperature and corrosion resistance.

A decisive advantage in the method for production of ceramic-like materials is the simple application of the precursor. A broad spectrum of industrial applications is obtained from this. An important area is refining, tempering and sealing of surfaces of any substrates in order to achieve better corrosion resistance even at higher temperatures, to improve sliding properties, or to produce gas-tight components. The method according to the invention also makes possible ceramic coatings of very complex geometries that cannot be achieved, for example, with the PVD/CVD process.

Another important area of application of the invention is use of the ceramic-like materials according to the invention as adhesion promoters to other layers, especially ceramic or ceramic-like layers that otherwise would not adhere to the substrate or only poorly. Moreover, owing to the physiological compatibility of the ceramic phases produced according to the invention, they can be used in medical technology. Because of the limited surface tension of the solution of the precursor according to the invention (oligosilazane-containing condensation product) and the resultant very good wetting behavior it is possible to infiltrate a wide variety of porous materials in order to produce components from the class of ceramic composites. An important area of application for ceramic composites includes filters for aggressive media. It is also possible according to the invention to infiltrate carbon components with a ceramic phase and decisively increase in this fashion their abrasion resistance and temperature resistance, which is an important criterion, for example, in pump construction or in the production of engine piston parts.

EXAMPLES

If not otherwise stated, all operations were conducted under a protective gas atmosphere ($N_2$).

Example 1

Production of a Titanium-containing Condensation Product (Curable Precursor)

40 g (0.179 mol) tetrakis(dimethylamino)titanium was dissolved in 100 mL toluene and slowly added dropwise to 53 g of an oligosilazane (M=633 g/mol, viscosity: 30 Pa·s) dissolved in 400 mL toluene and produced by coammonolysis of dichloromethylsilane and chlorotrimethylsilane in a molar ratio of 6.5:1, at room temperature and continuous agitation. The molar ratio of the average number of N atoms per oligosilazane and the number of titanium atoms was 4.8 to 1. The reaction mixture slowly turned brown; however, no heating or noticeable splitting off of dimethylamine was observed. After 12 h of heating under reflux cooling (about 115° C.) the toluene was distilled off and heating continued to 150° C. Vigorous splitting off of dimethylamine and the related slow thickening of the reaction mixture began. The product was thickened (about 60 min after the 150° C. temperature was reached) until it could almost no longer be agitated and the reaction was then interrupted. After cooling to a greenish brown, a very brittle solid that is soluble undecomposed in nonpolar solvents was obtained. This solid was exposed to vacuum for 6 h ($10^{-2}$ torr) to check whether it still contained volatile impurities (for example, tetrakis (dimethylamino)titanium). This was not the case. The yield was 78 g. This corresponds to a weight loss of 15 g or 1/3 mol HNMe$_2$. Thus, 1.86 mol HNMe$_2$ per mol of employed Ti[N(Me)$_2$]$_4$ was split off on average. The degree of substitution of the titanium atoms was consequently an average of 1.86. The average molecular weight of the obtained oligosilazane condensation product was 1300 g/mol, which indicated that, in addition to intermolecular oligosilazane crosslinking, intramolecular crosslinking of individual oligosilazane molecules occurred via the Ti[N(Me$_2$)]$_2$ units.

Example 2
Production of Three Coating Solutions

Coating solution (A): 5 g of solid oligosilazane condensation product obtained in Example 1 was dissolved in 35 mL (29.4 g) of dry toluene. Any insoluble components were initially filtered off or centrifuged, then weighed and replaced accordingly by addition of further condensation products so that a 17 wt % solution in toluene was obtained. The obtained solution had a dark greenish-brown color and was air-sensitive. The solution was stable for weeks under a protective gas.

Coating solution (B) was produced in the same manner as the coating solution (A) just described, except that cyclohexane was used as the solvent and the concentration was set at 12 wt %.

Coating solution (C): In the same manner as just described, a 12 wt % coating solution was produced from the titanium-containing condensation product of Example 1 with paraxylene as the solvent.

Example 3
Production of Titanium-containing Ceramic-like Layers

Steel sheets (V2A steel 40×60 mm) cleaned with acetone were sprayed with the coating solution (A) of Example 2 once with a spray gun.

The toluene was allowed to evaporate for a period of 30 min at room temperature and the steel sheet with the dry layer then transferred to a pyrolysis furnace (N$_2$ atmosphere) whose temperature was raised at 3 K/minute to 1000° C. and held at this temperature for 1 h. After cooling, a roughly 3–5 μm thick, grayish-blue, crack-free ceramic-like layer was obtained.

If air (about 20 vol % O$_2$) or an ammonia atmosphere containing 10 vol % NH$_3$ and 90 vol % N$_2$ is used in the pyrolysis furnace instead of a protective gas atmosphere consisting of nitrogen, the ceramic layer is colorless or exhibits a yellow color.

Example 4
Hardness Measurements on a Titanium-containing Ceramic-like Layer

Steel sheets cleaned with acetone (V2A steel 40×60 mm) were dipped into the coating solution (A) of Example 2 (by "dousing" with a thick jet from a laboratory spray bottle containing the coating solution).

The toluene was allowed to evaporate over a period of 30 min at room temperature and the steel sheets then transferred to a pyrolysis furnace (air atmosphere) with the dry layer, whose temperature was increased at 3 K/minute to 300, 400, 500, 600 and 700° C. and held at this temperature for 1 h. Colorless, crack-free ceramic-like layers were obtained in this manner with a thickness of 0.5–1 μm. The ultramicrohardness of these layers was determined with a Fischerscope H100 (produced by H. Fischer GmbH and Co.) according to the force-penetration depth method. The obtained values are shown in FIG. 1. It is apparent that the hardness rises abruptly above 600° C. and reaches values (about 5 GPa) that lie above the hardness values of quartz glass (reference).

Example 5
Production of a Titanium-containing Protective Layer from a Polycarbonate Sample A thin (3 mm) polycarbonate plate (size: 3×4 mm) was dipped in the coating solution (B) of Example 2, obtaining a roughly 0.5 μm layer. This layer was allowed to cure for 2 days in air. The hardness of this layer and the hardness of the uncoated polycarbonate sample (comparison) were determined in the same manner as in Example 4 with a Fischerscope H100. The coated polycarbonate sample exhibited an ultramicrohardness of 332.23 N/mm$^2$ (3.32 MPa), whereas the ultramicrohardness of the uncoated polycarbonate sample was only 177.28 N/mm$^2$ (1.77 MPa). The titanium-containing protective layer also exhibited excellent adhesion to the polycarbonate sample.

Example 6
Production of a Zirconium-containing Condensation Product (Curable Precursor)

47.8 g (0.179 mol) of tetrakis(dimethylamino)zirconium, which had been dissolved beforehand in 100 mL toluene, was introduced to a solution of 53 g (in 400 mL toluene) of the oligosilazane described in Example 1. The reaction was run in the same manner as described in Example 1. 84.5 g of product was obtained. The observed weight loss therefore corresponded to splitting off of an average of 1.9 dimethylamino groups from Zr[N(CH$_3$)$_2$]$_4$.

Example 7
Production of Two Coating Solutions

Coating solution (A): In the same manner as described in Example 2, a 17 wt % coating solution was produced with toluene as the solvent with zirconium-containing condensation product of Example 6.

Coating solution (B): In the same manner as described in Example 2, a 12 wt % coating solution was produced with paraxylene as the solvent from the zirconium-containing condensation product of Example 6.

Example 8
Production of Zirconium-containing Ceramic-like Layer

In the same manner as in Example 3, steel sheets coated with ceramic-like layers were produced with the coating solution (A) of Example 7. These layers were blue, colorless or yellow, depending on the employed atmosphere (N$_2$, air, NH$_3$-containing) were crack-free and exhibited good adhesion to the substrate (steel).

Example 9
Corrosion Behavior of Ti- and Zr-containing Ceramic-like Layers Under Different Curing Temperatures and Conditions 3×4 cm V2A steel sheets (brushed) were dipped in the coating solution (C) of Example 2 (12 wt % in paraxylene), in which after evaporation of the solvent, a roughly ½ μm thick layer was obtained from a titanium precursor.

Five identical steel sheets were then dipped into the coating solution (B) of Example 7 (12 wt % in paraxylene), in which after evaporation of the solvent a roughly ½ μm thick layer was obtained from the zirconium-containing precursor. Five of the steel samples coated in this manner were heated in a pure nitrogen atmosphere or in an air atmosphere at 3 K/minute to temperatures of 300, 400, 500, 600 and 700° C. and held at the corresponding temperature for 1 h. Adhesion of the ceramic-like layers to the brushed steel surface was very good.

After cooling, they were allowed to stand for 2 days in a 1M KOH solution and it was then investigated whether the sheet exhibited traces of corrosion. The results are summarized in the following Table 1. K stands for the observed corrosion traces and 0 denotes corrosion-free steel samples. It is apparent that steel sheets that proved to be corrosion-proof even in very aggressive media thanks to the ceramic-like layer according to the invention can be obtained by curing in air at temperatures of 400° C.

TABLE 1

| Sample | 300° C. | 400° C. | 500° C. | 600° C. | 700° C. |
|---|---|---|---|---|---|
| Ti ($N_2$) | K | K | O | O | O |
| Ti (Air) | K | O | O | O | O |
| Zr ($N_2$) | K | K | O | O | O |
| Zr (Air) | K | O | O | O | O |

K: observed corrosion traces
O: corrosion-free steel samples

What is claimed is:

1. Process for production of an oligosilazane-containing condensation product comprising the following step:

conversion of oligosilazane composition with a weight-averaged molecular weight of no more than 1000 g/mol, with a dialk(en)ylamino compound of the following formula (I)

$$A[N(R^4)_2]_m \qquad (I)$$

in which A represents at least one element chosen from B, Al, Ti, Zr, and Hf, $R^4$ is an alkyl group or alkenyl group and m is the valence of element A, in which the reaction is run so that an average of 1.6–2.2 mol $HN(R^4)_2$ per mol of dialk(en)ylamino compound of formula (I) is split off.

2. Method according to claim 1, characterized by the fact that the oligosilazanes have the formula (II):

$$X^1—[HN—SiR^1R^2]_n—X^2 \qquad (II)$$

in which $R^1$ and $R^2$, are independently selected from the group consisting of H, alkyl, alkenyl, and $[HN—SiR^1R^2]_{n'}—X^3$, wherein said $[HN—SiR^1R^2]_{n'}—X^3$ is present in at least one silazane unit of $[HN—SiR^1R^2]_n$;

n is a whole number from 2–14 and n' a whole number from 0–12, with the stipulation that the sum of the silazane units per oligosilazane (n+n') is 4–14;

$X^1$, $X^2$ and $X^3$, independent of each other, denote hydrogen, alkyl, alkenyl, or —HN—$SiR^3$ or —$SiR^3$ (in which $R^3$=alkyl or alkenyl) and $X^1$ and $X^2$, $X^1$ and $X^3$ or $X^2$ and $X^3$ together represent a single bond that closes a ring.

3. Method according to claim 1, characterized by the fact that the reaction is initially run while heating in a solvent, which is then distilled off.

4. Method according to claim 1, characterized by the fact that the reaction is run in an aprotic solvent.

5. Method according to claim 1, characterized by the fact that the molar ratio between the average number of N atoms per oligosilazane and element A is from 3.5:1–10:1.

6. Oligosilazane-containing condensation product obtained according to the process of claim 1.

7. Method for production of a coated or infiltrated substrate, comprising the following steps:

partial or complete coating or infiltration of a substrate with a solution of oligosilazane-containing condensation product according to claim 6;

evaporation of the solvent and curing of the oligosilazane-containing condensation product in the coated or infiltrated substrate.

8. Method according to claim 7, characterized by the fact that curing is carried out by firing at 500–1500° C. in an atmosphere containing a protective gas, oxygen, ammonia, or their mixtures.

9. Method according to claim 7, characterized by the fact that curing is carried out in an oxygen-containing atmosphere at 0–150° C.

10. Method according to claim 7, characterized by the fact that the solvent is aprotic.

11. Method according to claim 7, characterized by the fact that the solution contains the oligosilazane-containing condensation product in a concentration of 1–20 wt %.

12. Method according to claim 7, characterized by the fact that the substrate is dipped in the solution, sprayed with the solution or covered with the solution.

13. Method according to claim 7, characterized by the fact that at least one additional layer is applied to the product obtained in the curing step.

14. Method according to claim 13, characterized by the fact that the additional layer is ceramic-like or ceramic.

15. Method according to claim 7, characterized by the fact that the substrate comprises at least one of the following materials: metal, carbon, glass, plastic, ceramic.

16. Method according to claim 9, characterized by the fact that the substrate is a plastic.

17. A coated or infiltrated substrate obtained according to the method of claim 7.

18. Method according to claim 15 characterized by the fact that the substrate is a plastic.

* * * * *

UNITED STATES PATENT AND TRADEMARK OFFICE
CERTIFICATE OF CORRECTION

PATENT NO.     : 6,544,657 B1
DATED          : April 8, 2003
INVENTOR(S)    : Motz et al.

It is certified that error appears in the above-identified patent and that said Letters Patent is hereby corrected as shown below:

Column 1,
Line 63, "can be-produced by" should be -- can be produced by --.

Column 4,
Line 39, "with 1-4 carbon atoms)." should be -- with 1-4 carbon atoms.) --.

Column 5,
Line 39, "or Hf. $R^4$" should be -- or Hf, $R^4$ --.

Column 6,
Line 47, "for example, (oluene or" should be -- for example, toluene or --.

Column 7,
Line 40, "insoluble in-organic" should be -- insoluble in organic --.

Signed and Sealed this

Thirtieth Day of September, 2003

JAMES E. ROGAN
*Director of the United States Patent and Trademark Office*